United States Patent
Bajpai et al.

(10) Patent No.: US 8,155,672 B2
(45) Date of Patent: Apr. 10, 2012

(54) SCALABLE GEO-LOCATION EVENT PROCESSING

(75) Inventors: Ratan Bajpai, Mt. Laurel, NJ (US); John Buford, Princeton, NJ (US); Venkatesh Krishnaswamy, Holmdel, NJ (US); Xiaotao Wu, Metuchen, NJ (US)

(73) Assignee: Avaya Inc., Basking Ridge, NJ (US)

( * ) Notice: Subject to any disclaimer, the term of this patent is extended or adjusted under 35 U.S.C. 154(b) by 641 days.

(21) Appl. No.: 12/211,579

(22) Filed: Sep. 16, 2008

(65) Prior Publication Data
US 2010/0069092 A1    Mar. 18, 2010

(51) Int. Cl.
*H04Q 7/20* (2006.01)

(52) U.S. Cl. .................. 455/456.5; 455/445; 455/456.1; 725/35; 705/14

(58) Field of Classification Search ............... 455/456.5, 455/456.1, 445; 725/35; 705/14; 707/104.1
See application file for complete search history.

(56) References Cited

U.S. PATENT DOCUMENTS

| | | | |
|---|---|---|---|
| 5,214,757 A | 5/1993 | Mauney et al. | |
| 6,401,102 B1 | 6/2002 | Ishii et al. | |
| 6,614,352 B2 | 9/2003 | Pellet et al. | |
| 6,775,614 B2 | 8/2004 | Kim | |
| 6,816,735 B1 | 11/2004 | Rayburn et al. | |
| 6,823,256 B1 | 11/2004 | Burt | |
| 6,848,542 B2 | 2/2005 | Gailey et al. | |
| 6,871,137 B2 | 3/2005 | Scaer et al. | |
| 6,912,545 B1 | 6/2005 | Lundy et al. | |
| 6,915,211 B2 | 7/2005 | Kram et al. | |
| 6,944,447 B2 | 9/2005 | Portman et al. | |
| 6,947,976 B1 | 9/2005 | Devitt et al. | |
| 7,007,013 B2 | 2/2006 | Davis, II et al. | |
| 7,023,995 B2 | 4/2006 | Olsson | |
| 7,024,205 B1 | 4/2006 | Hose | |
| 7,031,724 B2 | 4/2006 | Ross et al. | |
| 7,062,279 B2 | 6/2006 | Cedervall et al. | |
| 7,072,665 B1 | 7/2006 | Blumberg et al. | |
| 7,116,985 B2 | 10/2006 | Wilson et al. | |
| 7,142,839 B2 | 11/2006 | Pelaez et al. | |
| 7,181,227 B2 | 2/2007 | Wilson et al. | |
| 7,190,960 B2 | 3/2007 | Wilson et al. | |
| 7,197,322 B1 | 3/2007 | Rayburn et al. | |
| 7,203,502 B2 | 4/2007 | Wilson et al. | |
| 7,224,987 B1 | 5/2007 | Bhela et al. | |

(Continued)

OTHER PUBLICATIONS

"Event Stream Processing", "Wikipedia http://en.wikipedia.org/w/index.php?title=Event_Stream_Processing&pri...", Jun. 8, 2009, Publisher: Wikimedia Foundation, Inc.

(Continued)

*Primary Examiner* — Danh Le (57) ABSTRACT

Traditional, server-oriented architectures have focused on providing location-based services by using publish-subscribe, efficient message buses, and filtering mechanisms. However, given an enterprise's unique requirements, these techniques have offered mixed results when used in an enterprise context. The present invention enables an efficient way to provide location-based services to an enterprise, as well as to integrate those location-based services into the enterprise's communications platform. A platform for supporting converged, location-based communications comprises one or more application servers such as a transactional server, a Session Initiation Protocol server, and so forth. In addition, the platform advantageously comprises an event processor for managing arriving location streams that are generated by targets being monitored. Such targets include the cell phones and WiFi handsets of the enterprise users, but can also include location data from various users arriving from multiple, fixed points such as credit card readers in stores.

12 Claims, 5 Drawing Sheets

U.S. PATENT DOCUMENTS

| | | |
|---|---|---|
| 7,228,140 B2 | 6/2007 | Anctil et al. |
| 7,236,799 B2 | 6/2007 | Wilson et al. |
| 7,263,086 B2 | 8/2007 | Viikari et al. |
| 7,272,393 B1 | 9/2007 | Wuthnow et al. |
| 7,305,245 B2 | 12/2007 | Alizadeh-Shabdiz |
| 7,305,365 B1 | 12/2007 | Bhela et al. |
| 7,327,258 B2 | 2/2008 | Fast et al. |
| 7,333,820 B2 | 2/2008 | Sheha et al. |
| 7,349,768 B2 | 3/2008 | Bruce et al. |
| 7,366,523 B2 | 4/2008 | Viikari et al. |
| 7,412,400 B1 | 8/2008 | Bhela et al. |
| 2002/0080968 A1 | 6/2002 | Olsson |
| 2002/0094822 A1 | 7/2002 | Anctil et al. |
| 2002/0126701 A1 | 9/2002 | Requena |
| 2002/0160766 A1 | 10/2002 | Portman et al. |
| 2002/0160772 A1 | 10/2002 | Gailey et al. |
| 2002/0161587 A1 | 10/2002 | Pitts, III et al. |
| 2002/0161627 A1 | 10/2002 | Gailey et al. |
| 2002/0161646 A1 | 10/2002 | Gailey et al. |
| 2002/0161647 A1 | 10/2002 | Gailey et al. |
| 2002/0176579 A1 | 11/2002 | Deshpande et al. |
| 2003/0036379 A1 | 2/2003 | Nikolai et al. |
| 2003/0080869 A1 | 5/2003 | Pellet et al. |
| 2003/0105587 A1 | 6/2003 | Kim |
| 2003/0171939 A1 | 9/2003 | Yagesh et al. |
| 2003/0202104 A1 | 10/2003 | Werner |
| 2003/0207683 A1 | 11/2003 | Lempio et al. |
| 2003/0212536 A1 | 11/2003 | Wang et al. |
| 2003/0216949 A1 | 11/2003 | Kram et al. |
| 2004/0019581 A1 | 1/2004 | Davis, II et al. |
| 2004/0087043 A1 | 5/2004 | Lee et al. |
| 2004/0092271 A1 | 5/2004 | Viikari et al. |
| 2004/0120323 A1 | 6/2004 | Viikari et al. |
| 2004/0148438 A1 | 7/2004 | Liscano |
| 2004/0192299 A1 | 9/2004 | Wilson et al. |
| 2004/0192339 A1 | 9/2004 | Wilson et al. |
| 2004/0192350 A1 | 9/2004 | Pelaez |
| 2004/0198397 A1 | 10/2004 | Weiss |
| 2004/0203883 A1 | 10/2004 | Jollis |
| 2004/0203900 A1 | 10/2004 | Cedervall et al. |
| 2004/0203901 A1 | 10/2004 | Wilson et al. |
| 2004/0203902 A1 | 10/2004 | Wilson et al. |
| 2004/0203903 A1 | 10/2004 | Wilson et al. |
| 2004/0203919 A1 | 10/2004 | Ross et al. |
| 2004/0225433 A1 | 11/2004 | Burt |
| 2004/0230467 A9 | 11/2004 | Gailey et al. |
| 2004/0235493 A1 | 11/2004 | Ekerborn |
| 2004/0243299 A1 | 12/2004 | Scaer et al. |
| 2004/0243417 A9 | 12/2004 | Pitts, III et al. |
| 2005/0027590 A9 | 2/2005 | Gailey et al. |
| 2005/0027591 A9 | 2/2005 | Gailey et al. |
| 2005/0034075 A1 | 2/2005 | Riegelman |
| 2005/0055353 A1 | 3/2005 | Marx et al. |
| 2005/0102180 A1 | 5/2005 | Gailey et al. |
| 2005/0135264 A1 | 6/2005 | Popoff et al. |
| 2005/0143097 A1 | 6/2005 | Wilson et al. |
| 2005/0159216 A1 | 7/2005 | Chiu et al. |
| 2005/0221812 A9 | 10/2005 | Gailey et al. |
| 2005/0255861 A1 | 11/2005 | Wilson et al. |
| 2005/0272445 A1 | 12/2005 | Zellner |
| 2005/0286421 A1 | 12/2005 | Janacek |
| 2005/0289095 A1 | 12/2005 | Rauhala et al. |
| 2006/0126601 A1 | 6/2006 | Kim et al. |
| 2006/0142027 A1 | 6/2006 | Krishnamurthi et al. |
| 2006/0189328 A1 | 8/2006 | Cedervall et al. |
| 2006/0217131 A1 | 9/2006 | Alizadeh-Shabdiz et al. |
| 2006/0270391 A1 | 11/2006 | Kim et al. |
| 2006/0270421 A1 | 11/2006 | Phillips et al. |
| 2007/0060171 A1 | 3/2007 | Sudit et al. |
| 2007/0118604 A1 | 5/2007 | Costa Requena |
| 2007/0124472 A1 | 5/2007 | Requena |
| 2007/0149210 A1 | 6/2007 | McKiou et al. |
| 2007/0149212 A1 | 6/2007 | Gupta et al. |
| 2007/0202844 A1 | 8/2007 | Wilson et al. |
| 2007/0205888 A1 | 9/2007 | Lee et al. |
| 2007/0220038 A1 | 9/2007 | Crago |
| 2007/0244633 A1 | 10/2007 | Phillips et al. |
| 2007/0244750 A1* | 10/2007 | Grannan et al. ............ 705/14 |
| 2007/0270132 A1 | 11/2007 | Poosala |
| 2007/0270161 A1 | 11/2007 | Hampel et al. |
| 2007/0270163 A1 | 11/2007 | Anupam et al. |
| 2007/0270165 A1 | 11/2007 | Poosala |
| 2007/0270166 A1 | 11/2007 | Hampel et al. |
| 2008/0004043 A1 | 1/2008 | Wilson et al. |
| 2008/0065774 A1 | 3/2008 | Keeler |
| 2008/0080486 A1 | 4/2008 | Kim et al. |
| 2008/0085724 A1 | 4/2008 | Cormier et al. |
| 2008/0114612 A1 | 5/2008 | Needham et al. |
| 2008/0243824 A1 | 10/2008 | Bruce et al. |
| 2009/0100459 A1* | 4/2009 | Riedl et al. ............ 725/35 |
| 2010/0030806 A1* | 2/2010 | Kuhlke et al. ............ 707/104.1 |

OTHER PUBLICATIONS

Cuellar et al., "Geopriv Requirements", "Network Working Group—Informational http://www.ietf.org/rfc/rfc3693.txt", Feb. 2004, Publisher: The Internet Society.

Peterson, J., "A Presence-based GEOPRIV Location Object Format", "Network Working Group—Standards Track http://tools.ietf.org/html/rfc4119", Dec. 2005, Publisher: The Internet Society.

* cited by examiner

SCALABLE GEO-LOCATION EVENT PROCESSING

FIELD OF THE INVENTION

The present invention relates to telecommunications in general, and, more particularly, to geo-location event processing.

BACKGROUND OF THE INVENTION

Location-based services are information services that are accessible by or are, at least, enabled by mobile devices. These services are capable of utilizing the geographical position of one or more mobile devices—that is, the "geo-location" of each device. Location-based services include services for identifying a location-relevant person, asset or resource, or other object, and include determining the nearest automated teller machine or the whereabouts of a friend.

Initially, location-based services (LBS) were offered mainly by cellular telephony service providers to their subscribers. The cell phones themselves had much of the LBS functionality embedded. Over time, however, more and more of the LBS functionality was off-loaded into application servers present in the service providers' network infrastructure.

Location-based services are not only applicable to cellular networks. Indeed, enterprises such as businesses, schools, hospitals, and so forth can use these services to enhance the customer experience and improve workforce operational efficiency. The function of location integration in enterprise communications includes the use of both real-time and historical location information of mobile users in telecommunications services. The potential participants include an organization's customers, employees, vendors, and partners.

There are a number of possible benefits to an enterprise's operations if location information can be incorporated into the communications context. Additionally, the organization can provide better service to its customers if location can be automatically incorporated into a customer's service context. In general, beneficial enterprise applications that can use location-based services are both diverse and many.

SUMMARY OF THE INVENTION

There are various considerations in providing location-based services that are somewhat unique to enterprises. A first consideration is the large number of location "targets" such as customers and employees. A second consideration is the large number of sources of location information such as cell phones, WiFi-enabled devices, credit card readers, and so forth. And a third consideration is the type of processing required for certain enterprise-specific applications that require comparing the geo-locations of multiple targets, such as event correlation. These and other considerations pose significant obstacles to providing location-based services within an enterprise context. Traditional, server-oriented architectures have focused on providing location-based services by using publish-subscribe, efficient message buses, and filtering mechanisms. However, given the unique requirements of an enterprise, these traditional techniques have offered mixed results when used in an enterprise context.

The present invention enables a more efficient, scalable way to provide location-based services to an enterprise, as well as to integrate those location-based services into the enterprise's communications platform. In accordance with the illustrative embodiment, a platform for supporting converged, location-based communications comprises one or more application servers such as a transactional server, a Session Initiation Protocol server, and so forth. In addition, the platform advantageously comprises an event processor for managing arriving location streams that are generated by targets being monitored. Such targets include the cell phones and WiFi handsets of the enterprise users, but can also include location data from various users arriving from multiple, fixed points such as credit card readers in stores.

Event processing is an emerging technology that is helping enterprise organizations build and manage responsive information systems. Event processing enables an enterprise to discover the events flowing through the organization, understand the impact of the events on the enterprise, and act on events in an appropriate and timely manner. Event processing enhances enterprise process management in many ways that traditional, static systems cannot. Traditional enterprise process management tools often rely on simple rules triggered from databases or data warehouses, in accordance with a server-oriented architecture (SOA), in which updates take place daily or less frequently. Event processing's real-time processing interface, in contrast, is geared toward an event driven architecture (EDA), and provides an organization with dynamic tools to better manage its enterprise processes and make decisions more quickly, based on the immediate availability of information.

The primary difference between i) a database management system based on server-oriented architecture in the prior art and ii) an event processing system is that, while database management systems intermittently execute queries on static data in order to produce result sets, an event processing server evaluates persistent event conditions on streaming data in order to detect events as they occur. In other words, an event processing system is designed to handle real-time, continually changing data. Another critical difference between a database management system and an event processing system is the fact that a database management system is limited to the data that it contains at a given moment; by contrast, an event processing system can correlate data from different sources to create an event.

Where event correlation has been integrated into an enterprise system in the past, it has generally been a customized, embedded component as in a network management system, rather than a generic programmable component. By featuring an event processor to provide location-based services in an enterprise context, instead of a database management system running on an application server, the platform of the illustrative embodiment off-loads the low-level location stream processing from the application server.

Certain location-based services are particularly well-suited to the platform of the illustrative embodiment. Those services include real-time asset monitoring, location-based push advertising, location-based service delivery, and location-based reminders. Furthermore, more efficient dispatching or routing of mobile employees for sales, delivery, and customer support can be achieved. In addition, there are interesting applications in specific vertical markets such as health care, travel, retail, real estate, and social networking. As those who are skilled in the art will appreciate, after reading this specification, additional services can be advantageously based on the event-processor-equipped platform of the illustrative embodiment.

The illustrative embodiment of the present invention is particularly well-suited for an enterprise environment. However, it will be clear to those skilled in the art, after reading this specification, how to make and use alternative embodiments which are well-suited for non-enterprise applications as well.

The illustrative embodiment of the present invention comprises a method for providing a location-based service at a data-processing system that comprises at least one event processor, the method comprising: receiving, at the data-processing system, a request that pertains to an event of interest; receiving, at the at least one event processor, a plurality of location streams, each location stream corresponding to a different target in a plurality of targets, and each location stream comprising one or more location events that are generated by or on behalf of its corresponding target; and deriving, at the at least one event processor, the event of interest from among at least one location event that exists within at least one of the location streams, the derivation being based on the request; and generating a derived event stream that comprises the event of interest.

DETAILED DESCRIPTION

Figure 1:
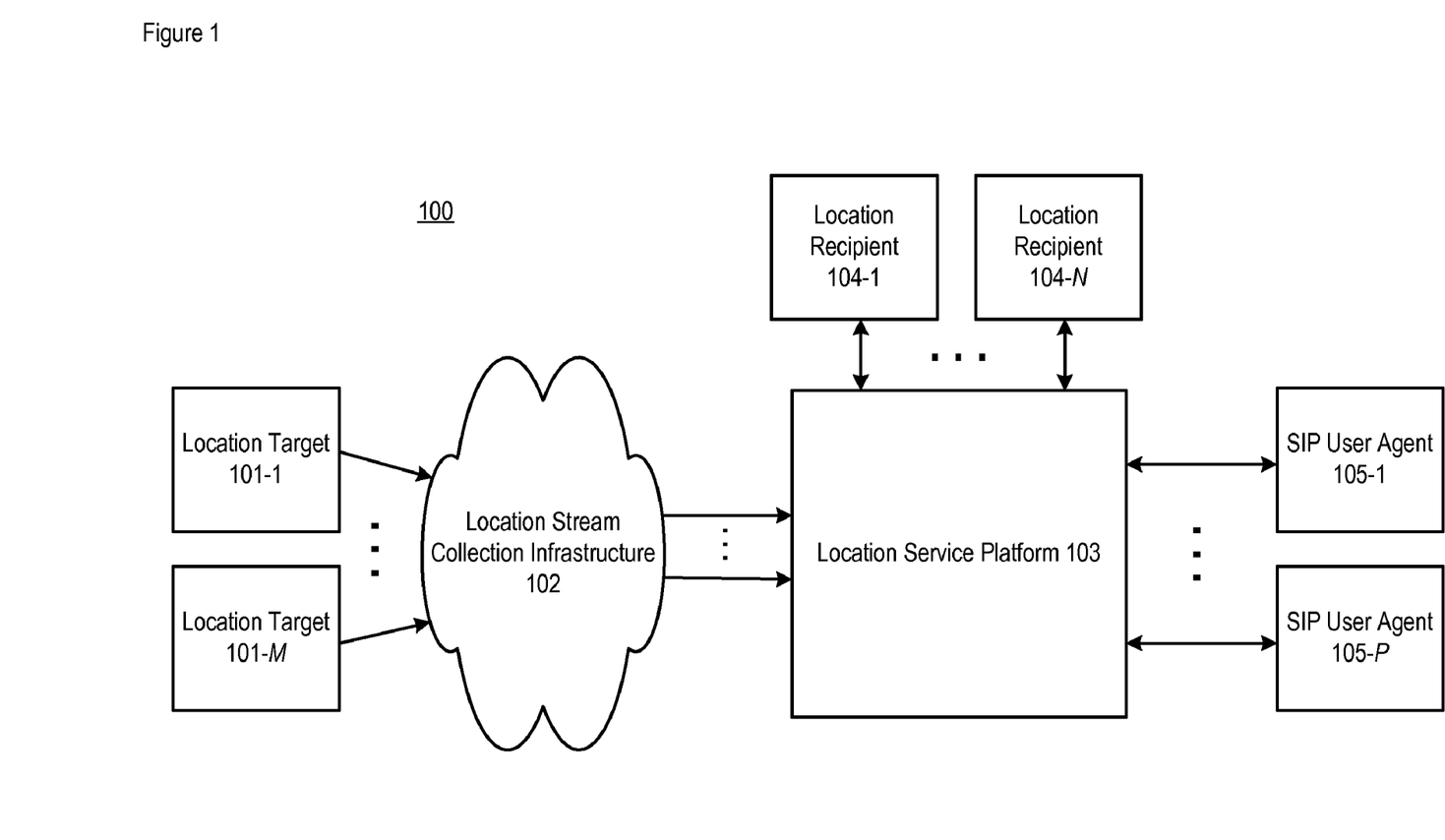
FIG. 1 depicts enterprise system 100, in accordance with the illustrative embodiment of the present invention.

FIG. 1 depicts enterprise system 100, in accordance with the illustrative embodiment of the present invention. System 100 comprises location targets 101-1 through 101-M, location stream collection infrastructure 102; location service platform 103; location recipients 104-1 through 104-N, and Session Initiation Protocol (SIP) user agents 105-1 through 105-P, wherein M, N, and P are positive integers. The depicted elements are interconnected as shown.

Location target 101-$m$, for m=1 through M, is an object that is capable of reporting its location, or of having its location ascertained and reported, on an ongoing basis via a location event stream. For example, target 101-$m$ can be a mobile, telecommunications device such as a cell phone or a WiFi-capable device. Location target 101-$m$ can be representative of a person such as a worker of an enterprise, of a thing such as an asset of an enterprise, or of another type of object. Location data for location target 101-$m$ can also arrive from a fixed source such as a credit card reader that reports on purchases made by each shopper target at a store.

Figure 2:
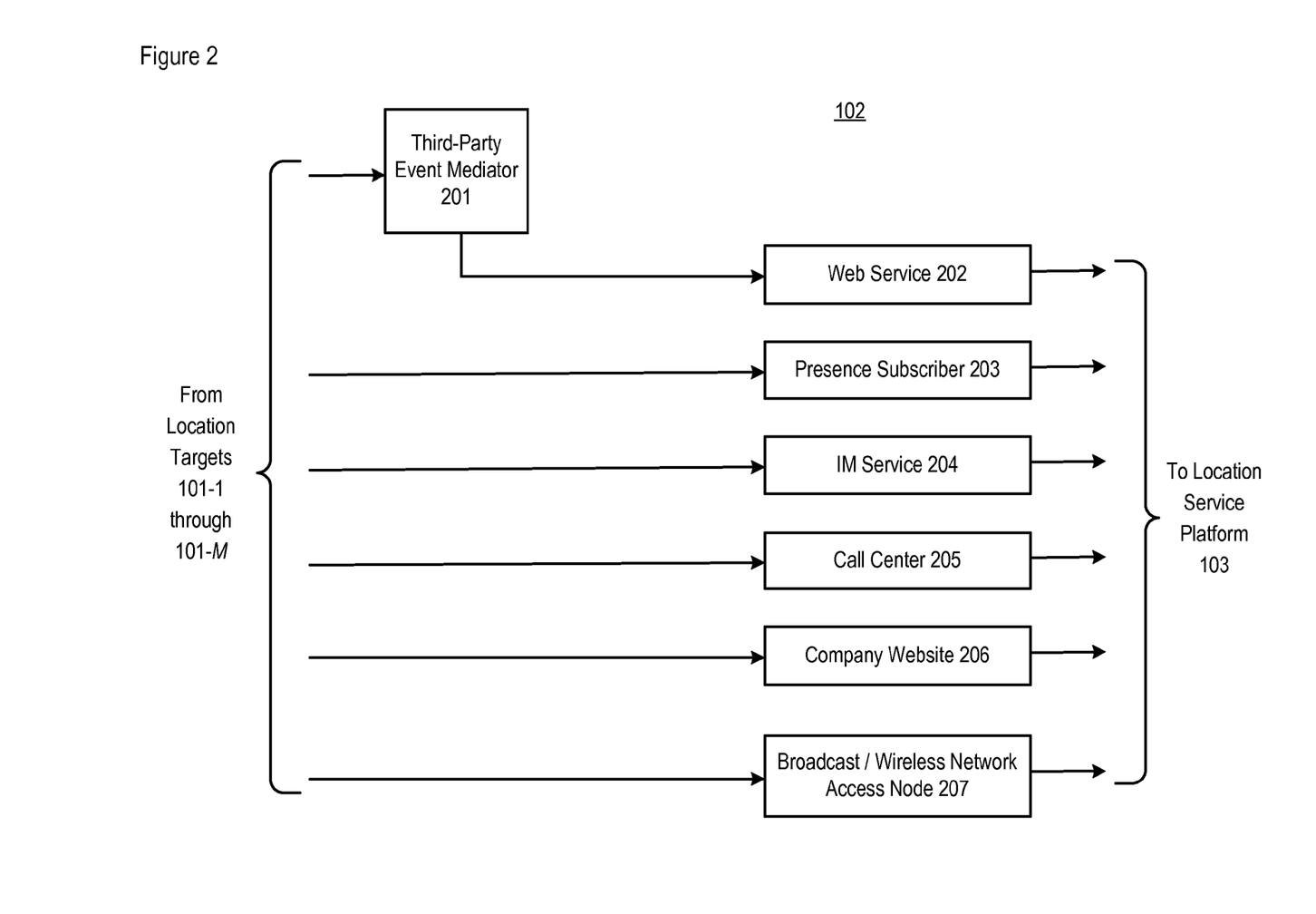
FIG. 2 depicts collection infrastructure 102, which collects raw location streams from targets 101-1 through 101-M, within system 100.

Location stream collection infrastructure 102 provides for the collection of location data from targets, in which each target provides location objects as a function of time in a location event stream, or simply "location stream." As depicted in FIG. 2, raw location streams from targets 101-1 through 101-M can be collected by, while not being limited to, one or more of the following nodes:

i. third-party event mediator 201 and web service 202;
ii. presence subscriber 203, in the form of presence information in a SIP message;
iii. instant-messaging service 204, in the form of location information in a text message (e.g., Dodgeball, Google, etc.);
iv. call center 205, in the form of location information in a SIP INVITE message body;
v. company website 206, in the form of a cookie carrying a user identifier in an http message; and
vi. broadcast or wireless network access node 207, in the form of location data contained in a network layer of a message.

Infrastructure 102 provides the collected location streams to location service platform 103, as well as the timestamps that correspond to the location data being collected.

Various mechanisms exist within enterprise system 100 to request and receive location streams. A first mechanism is subscription, in which a subscriber sends a request to the target, or to its location generator such as in a cellular network, in order to receive location objects. If the request is accepted by the target, then the target will publish location objects at some mutually agreed upon rate and/or resolution to the subscriber, subject to privacy and other constraints, until the subscription is terminated or the subscription lifetime expires. The publisher maintains some state for each active subscription, such as the identity of the subscriber, network address, and type of subscription. An advantage of publish-subscribe is that it supports dynamic associations between sources and recipients of information.

A second mechanism is polling. For example, a recipient could periodically send a request to the target for the latest location object or objects. An advantage of polling is that the recipient can directly control the rate of location object delivery.

A third mechanism is configuration, whereby some control point or points in the system determine which targets deliver their location to which recipients. For example, in an enterprise, all field service personnel could have their company-issued equipment configured to publish location objects to specified recipients.

A fourth mechanism is broadcast, whereby a target sends location objects to all other devices attached to the network. Variations of broadcast include multicast and restricted area broadcast. An advantage of broadcast is its simplicity of operation.

Publish-subscribe, already described above, is a common enterprise mechanism that is referred to throughout this specification, as part of the illustrative embodiment of the present invention. It will be clear, however, to those who are skilled in the art how to make and use embodiments of the invention that use other mechanisms to connect targets and recipients, including mechanisms already described such as polling, configuration, and broadcast. In addition, as those who are skilled in the art will further appreciate, these different embodiments can co-exist in a given domain for different targets and/or recipients, and there can be hybrid combinations where location objects are delivered via intermediary nodes.

Location service platform 103, which comprises one or more data-processing systems, provides one or more location-based telecommunications services to location recipients 104-1 through 104-N through an interface that receives requests from the location recipients. A web services interface is used in the illustrative embodiment, but as those who are skilled in the art will appreciate, in some alternative embodiments, other types of interfaces can be used to interconnect different applications and information systems. Those other types of interfaces include TCP connection, message bus, remote procedure call, shared database, CORBA, peer-to-peer overlay, and so forth.

Each location service processed by platform 103 subscribes, or otherwise gains access, to real-time location streams received from collection infrastructure 102. Each location recipient 104-*n*, for n=1 through N, is an application that performs a location-dependent service such as targeted advertising, sales alerting, nearest sales call handling, customer routing, and other use cases that are described below.

Platform 103 is also able to call SIP user agent 105-*p*, for p=1 through P. As those who are skilled in the art will appreciate, each "call" (or session) can be uni-modal (i.e., one of audio, video, and so forth) or multi-modal (i.e., two or more media types transported). User agent 105-*p* can represent target 101-*m* or can represent another entity within enterprise system 100. Each user agent can also publish and subscribe to SIP events and user presence, and can exchange instant messages with platform 103.

The salient components of platform 103 are described below and with respect to FIG. 3. The salient tasks performed by platform 103 are described below and with respect to FIG. 5. It will be clear to those skilled in the art, after reading this specification, how to make and use platform 103.

Figure 3:
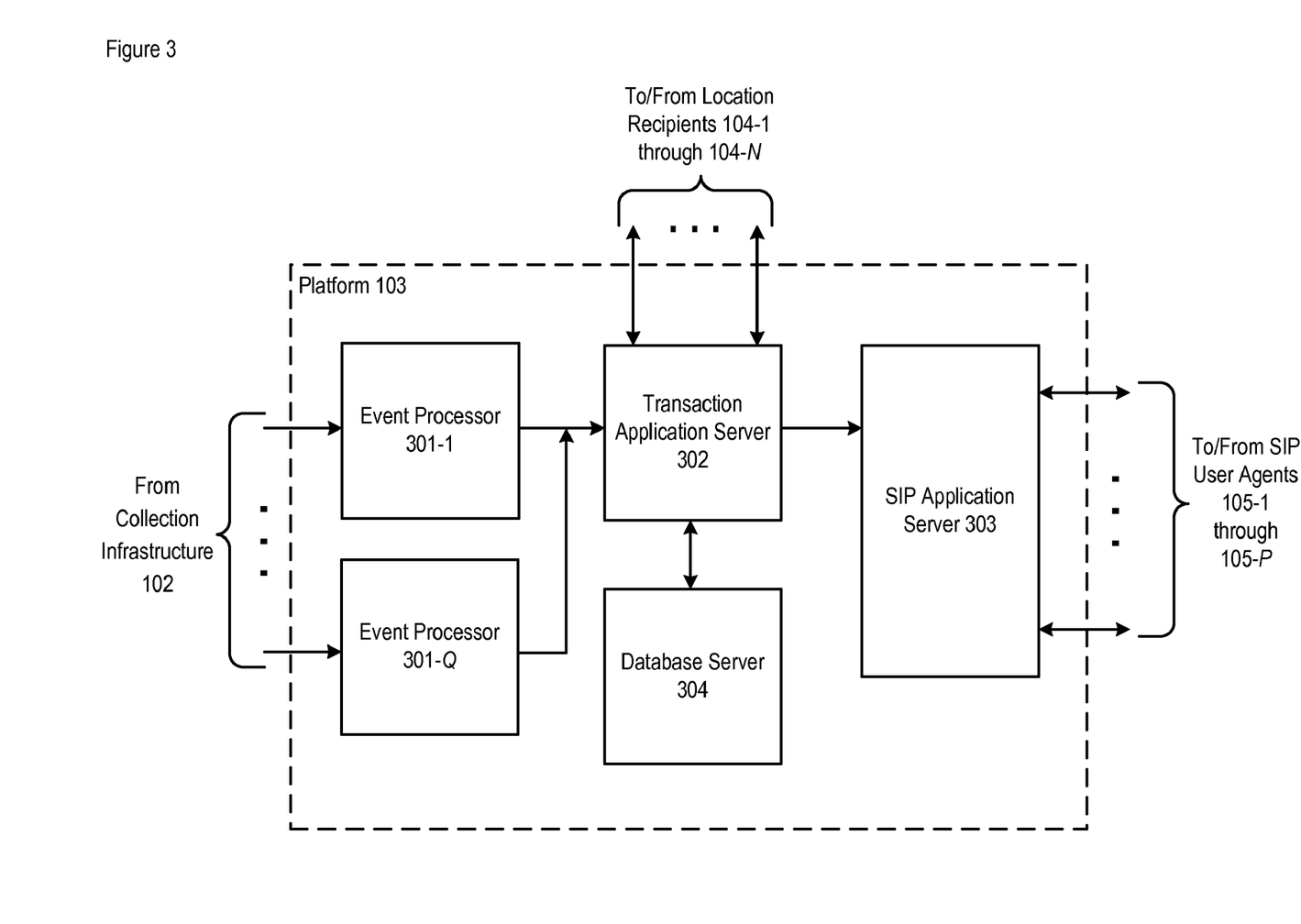
FIG. 3 depicts the salient components of location service platform 103 within system 100, in accordance with the illustrative embodiment of the present invention.

FIG. 3 depicts the salient components of location service platform 103, in accordance with the illustrative embodiment of the present invention. Platform 103 comprises event processors 301-1 through 301-Q, wherein Q is a positive integer; transaction application server 302; SIP application server 303; and database server 304, interrelated as shown.

In the illustrative embodiment, event processors 301-1 through 301-Q, transaction application server 302, and SIP application server 303, and database server 304 are software modules that execute at platform 103. However, it will be clear to those who are skilled in the art, after reading this specification, how to make and use alternative embodiments in which some or all of the software modules identified are instead physically-distinct, data-processing systems that execute the functionalities that correspond to the modules identified.

Event processor 301-*q*, for q=1 through Q, is an event filtering and correlation engine. A function of processor 301-*q* is to detect events on data streams. In accordance with the illustrative embodiment, processor 301-*q* operates on the location data streams arriving from various targets, as described in more detail below. Geographic and/or temporal constraints are provided to event processor 301-*q* for the purpose of deriving events from the location streams being subscribed to.

In some embodiments, event processor 301-*q* is programmable and uses an SQL-like programming language. Written in Java, event processor 301-*q* handles events by pre-compiling SQL-like scripts into Java byte code, and then applying the rules of those scripts to the data streams that flow into its memory. When matches are detected, output events are triggered. An example event handler is shown below in Table 1, which handler tests for user proximity to a specific position. As reflected in the example below, when the test succeeds a notification event is sent to interested subscribers.

TABLE 1

```
ON
  RAW_LOCATION
WHEN
  RAW_LOCATION.agentName = 'John' AND
  INRANGE(RAW_LOCATION.lat, RAW_LOCATION.long,
    40.0, 53.3, 100.0)
THEN
  PROXIMITY_DETECTED.INSERT(
    agentName = RAW_LOCATION.agentName,
    agentLat = RAW_LOCATION.lat,
    agentLong = RAW_LOCATION.long,
    requestId = 1234),
  PRINT('Proximity Detected')
```

Processor 301-*q* is used as part of platform 103 of the illustrative embodiment in the following manner. Location events in location streams arrive at processor 301-*q* from various targets. Transaction application server 302 responds to incoming application requests by subscribing to specific location events or by performing queries for historical location information stored at database server 304. When an event of interest is triggered at event processor 301-*q*, the event processor forwards a notification event to server 302.

Server 302 then may use the event to trigger a callback to the subscribing application represented by one of location recipients 104-1 through 104-N; initiate telephone calls to users or update rich presence attributes via SIP application server 303, which users and attributes are represented by user agents 105-1 through 105-P; or update user location history, time stamps, and so forth that are stored at database server 304.

SIP application server 303 is able to create connections between two or more of user agents 105-1 through 105-P. For example, with respect to initiating telephone calls (sessions), server 303 can connect a user agent that represents a particular target to a user agent of a customer service representative, a buddy's SIP user agent, and so forth. In addition, server 303 can create multi-party calls and conference calls that involve connecting user agents that might or might not include the target.

In accordance with the illustrative embodiment, application server 303 interworks with user agents 105-1 through 105-P in accordance with the Session Initiation Protocol (SIP). As those who are skilled in the art will appreciate, in some alternative embodiments, server 303 can interwork with the user agents in accordance with a different communication protocol such as H.323 or WSIP, which is a SIP-like protocol that uses web services.

Platform 103 of the illustrative embodiment further comprises an application programming interface (API) for supporting a variety of use cases, as shown below in Table 2. These location-service methods allow applications to specify communication agents according to their positions rather than uniform resource identifiers (URI). The particular location service executing at transaction processor 302, in turn, invokes services on event processor 301-*q* and on SIP application server 303, in order to subscribe to location events and to signal communications to user agents, respectively. The location service may also access historical location information in database 304.

TABLE 2

| Method | Description |
| --- | --- |
| CallByLocation | From a set of participants, call the party who is closest to a specified target position |
| CallByProximity | Connect two parties when their respective locations are within a certain proximity |
| CallbackBy Proximity | When a participant is in range of a target position, issue a call to some party |
| CallNearest PhoneToLocation | For a geo-location, identify the nearest phone and place a call to that phone |
| CallLocation | Place a call to a named location, which is automatically mapped to the corresponding number |
| RemindBy Location | Call a party with a reminder when the party is in proximity to a location |

In performing the tasks of the illustrative embodiment, event processor 301-*q* offloads transactional server 302 and SIP application server 303 from the processing of the location streams and provides a powerful programming environment including event windows, filters, and event persistence. In particular, in an enterprise environment, the number of targets (i.e., customers and employees) can be especially high (e.g., 100,000 concurrent targets, etc.). At the same time, each type of location service that is particularly applicable to an enterprise environment often requires multiple location streams to be simultaneously processed, in order to generate the subscribed-to events. These location-based services constitute i) monitoring of one or more assets of the enterprise, ii) pushing advertisements based on location, iii) delivering services or resources based on location, iv) transmitting reminders based on location, and v) tracking the density of one or more targets within a geographic area that is based on location, for one or more geographic areas. Given the high number of targets combined with the need to process multiple location data streams, the illustrative embodiment is well-suited for this combination.

Figure 4:
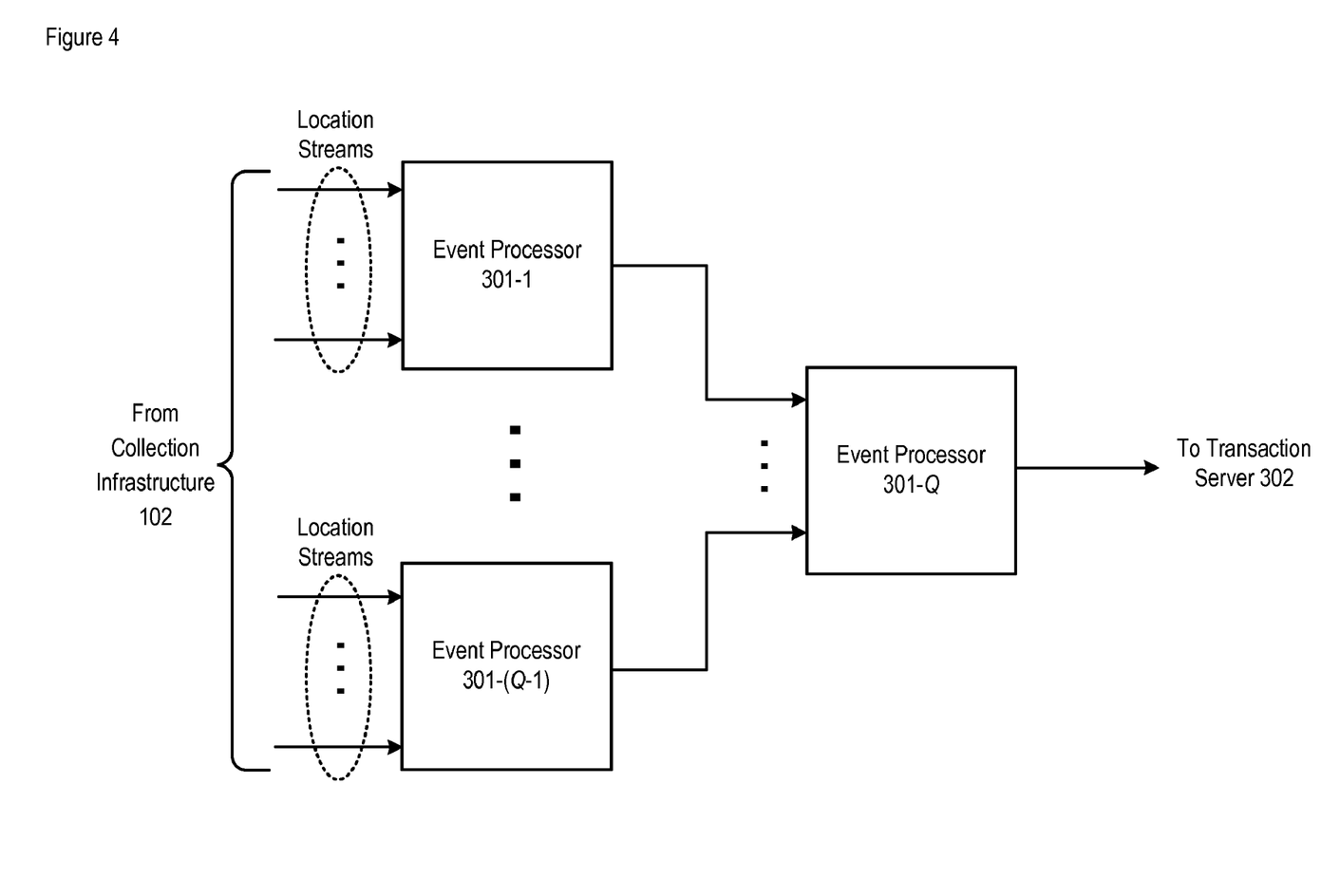
FIG. 4 depicts a multi-tiered configuration of event processors 301-1 through 301-Q of platform 103.

The combined rate of the incoming location event streams may exceed the capacity of a single event processor. In some embodiments of the present invention, platform 103 utilizes a scalable, multi-tiered configuration to divide the raw streams across multiple event processors (i.e., processor 301-1 through 301-Q), such that any pair of streams can still be correlated. The multi-tiered configuration is depicted in FIG. 4. Each processor 301-$q$ on the first tier receives some set of location streams that are within its capacity, so that all location streams go to at least one first-tier event processor. The assignment of streams can be by target geographic area, affinity to a social network whose other members are handled by the same event processor, customer priority, application subscriptions, or other criteria. Assignments can be static or dynamic. For example, a target 101-$m$ might re-locate to a different country, so the assigned tier 1 event processor could change to one located in that country.

Subscriptions and application requests that can be handled at a single event processor go directly to the first tier. Such requests include proximity of a target to a fixed object or position, proximity of two targets that are handled by the same event processor, and sub-sampling of a location stream. In contrast, a request that cannot be handled by a tier 1 event processor is forwarded within platform 103 to a tier 2 event processor. The selection of the tier 2 event processor can be based on capacity, previous assignments, geographic proximity to the associated tier 1 event processors, or some other criteria. The tier 2 event processor issues a subscription to the tier 1 event processors for the necessary streams to process. It processes these streams and generates the necessary events or calls to subscribers or applications.

As those who are skilled in the art will appreciate, the tiering of event processors benefits from various enterprise-centric scenarios, in that i) only a fraction of the total number of raw streams will need to be correlated at any time and ii) the streams forwarded to tier 2 will usually be at a reduced resolution from those received at tier 1. As those who are skilled in the art will further appreciate, additional tiers of event processors can be added to the event-processor configuration, in order to perform further derivations between larger sets of streams. Moreover, the set of event processors 301-1 through 301-Q can be divided up between two or more tiers according to a hierarchy other than that implied by FIG. 4.

In some embodiments, scaling of the event processors can be combined with failover and redundancy for fault tolerance. For example, two event processors may be operated in a redundant mode such that each receives the same streams and performs the same processing. One of the two would act as the primary and deliver the results to the subscribers and applications. If the primary were to fail or be taken offline, then the secondary would be switched into the primary role.

Another capability that exists among multiple event processors 301-1 through 301-Q is the persisting of location information at each event processor. This enables queries to be conveniently performed without consideration as to which specific event processor was responsible for a given stream at a given time.

The particular configuration of components that constitute platform 103, as depicted in FIG. 3, is representative of the illustrative embodiment. However, it will be clear to those skilled in the art, after reading this specification, how to make and use alternative embodiments that feature different configurations of platform 103 from that depicted. For example, different event processor configurations are possible, such as those with one or more event processors that are embedded, standalone, distributed, directly connected, connected via a message bus, or connected via a publish/subscribe interface. Also, different configurations of transaction servers and/or SIP application servers from that depicted are possible.

Figure 5:
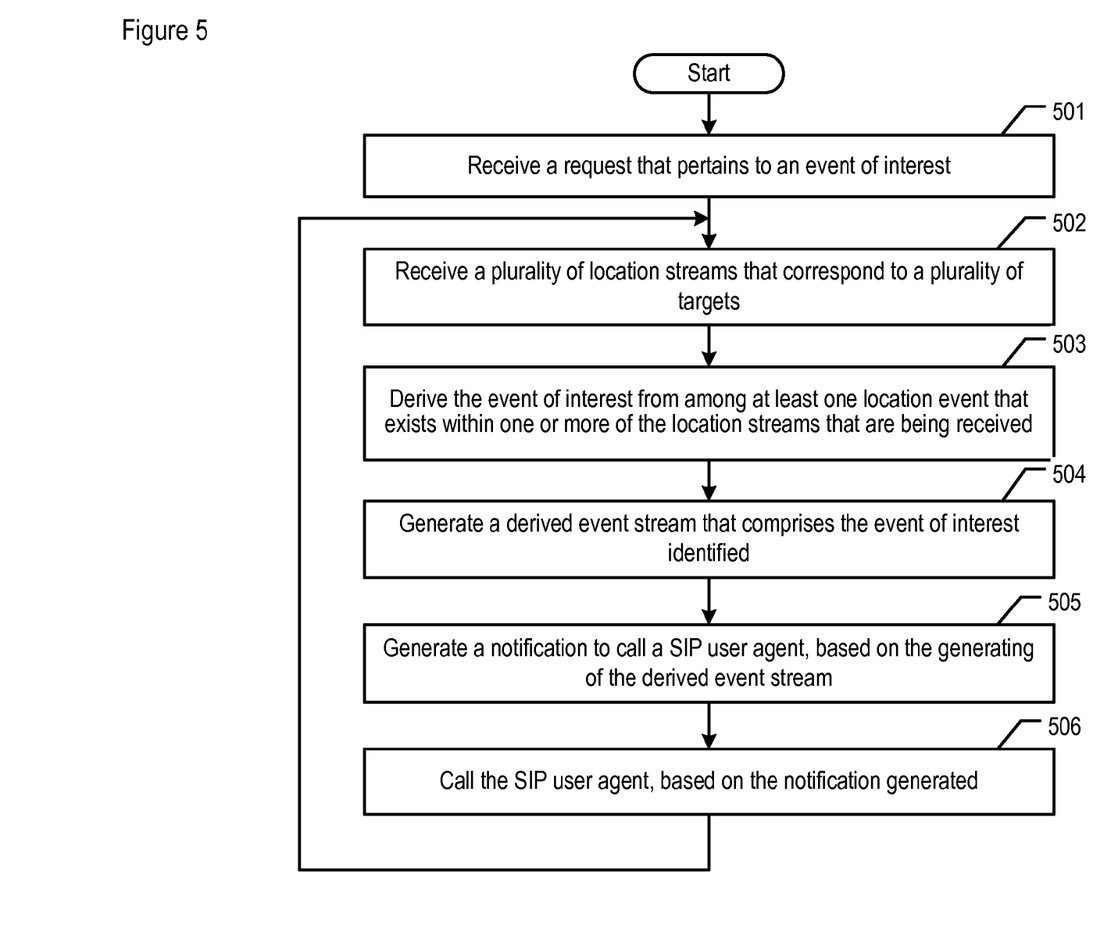
FIG. 5 depicts a flowchart of the salient tasks associated with the operation of the illustrative embodiment of the present invention, as performed by platform 103.

FIG. 5 depicts a flowchart of the salient tasks associated with the operation of the illustrative embodiment of the present invention. As those who are skilled in the art will appreciate, in some alternative embodiments, only a subset of the depicted tasks is performed. In some other alternative embodiments, at least some of the tasks are performed simultaneously or in a different order from that depicted.

In the illustrative example, event processor 301-$q$ is embedded within location service platform 103, a data-processing system, and is one of possibly multiple, embedded event processors. However, it will be clear to those who are skilled in the art, after reading this specification, how to make and use embodiments in which some or all of the event processors are instead standalone systems.

Additionally in the illustrative example provided, location service platform 103 receives a single request that pertains to a single event of interest. As those who are skilled in the art will appreciate, however, platform 103 is capable of handling concurrently multiple requests from multiple subscribers, for multiple events of interest.

At task 501, platform 103 receives from a requesting node, in this case location recipient 104-$n$, a request that pertains to an event of interest. In some embodiments, application server 302 performs this task. The request, which can for example be a subscription request, might comprise a geographic and/or temporal constraint.

At task 502, event processor 301-$q$ of platform 103 receives a plurality of location streams that correspond to the plurality of targets 101-1 through 101-M. Each location stream corresponds to a different target of the plurality of targets. Additionally, each location stream comprises one or more location events that are generated by its corresponding target. As those who are skilled in the art will appreciate, in some embodiments, the location events in some or all of the location streams might be generated by another network node, such as a position-determining entity in a cellular network, on behalf of the target.

At task 503, event processor 301-$q$ of platform 103 derives the event of interest from among at least one location event that exists within one or more of the location streams that are being received. The derivation is based on the request received at task 501. The derived event of interest can be one of the location events, or it can be inferred from a combination of location events. For example, if a request is "target density in geographic area of interest >10," when the number of targets in the specified area exceeds 10, then event processor 301-*q* generates a new event with the indicated information, such as "density threshold exceeded in the area of interest."

In some embodiments, platform 103 provides for the integration of real-time information other than location events and/or historical location information (e.g., stored in database server 304, etc.) into the logic of one or more event processors that are processing the events, as well as persistent or contextual information beyond location information.

At task 504, platform 103 generates a derived event stream that comprises one or more events of interest as derived at task 503. In some embodiments, application server 302 performs this task. Platform 103 provides the derived event stream to the requesting node, in some embodiments.

At task 505, in some embodiments, platform 103 generates a notification to call a SIP user agent, based on the generating of the derived event stream at task 504. In some embodiments, transaction application server 302 notifies SIP application server 303 to call the user agent. The user agent, for example, can represent one of targets 101-1 through 101-M or can represent another person or telecommunications device within enterprise system 100.

In some embodiments, the SIP user agent to be called can be selected based on a customer profile that is associated with a target, or can be selected based on customer service rep workload, locale, product line, service tier, or other information, as used in customer care routing.

At task 506, platform 103 calls the SIP user agent, based on the notification generated at task 505.

Platform 103 continues to event-process the request for the event of interest while location events continue to arrive in the location streams. As those who are skilled in the art will appreciate, at some point the requesting node, if a subscribing node, might elect to unsubscribe from the event of interest.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for providing a location-based service, the method comprising:
    receiving, at a data-processing system, a request that pertains to an event of interest;
    receiving a plurality of location streams, each location stream corresponding to a location of a different user of a plurality of users, and each location stream comprising a location event that is generated by or on behalf of its corresponding user;
    deriving the event of interest from among at least one location event that exists within at least one of the location streams, the derivating being based on the request;
    generating a derived event stream that comprises the event of interest; and
    generating a notification to call an user agent, based on the generating of the derived event stream.

2. The method of claim 1 wherein the request comprises a geographic constraint.

3. The method of claim 1 wherein the request comprises a temporal constraint.

4. The method of claim 1 wherein an application server of the data-processing system receives the request and forwards the request to the at least one event processor.

5. The method of claim 1 wherein the user agent represents a user in the plurality of users.

6. The method of claim 5 wherein the location-based service constitutes pushing an advertisement to the user via the user agent.

7. The method of claim 5 wherein the location-based service constitutes delivering a service or resource to the user via the user agent.

8. The method of claim 5 wherein the location-based service constitutes transmitting a reminder to the user via the user agent.

9. The method of claim 1 wherein the location-based service constitutes monitoring an asset of the enterprise, wherein a user in the plurality of users represents the asset.

10. The method of claim 1 wherein the location-based service constitutes tracking the density of one or more users in the plurality of users, within a geographic area.

11. A system for providing a location-based service, the system comprising:
    an application server configured to receive a request that pertains to an event of interest;
    an event processor configured to i) receive a plurality of location streams, each location stream corresponding to a location of a different person of a plurality of persons, and each location stream comprising a location event that is generated by or on behalf of its corresponding person, ii) derive the event of interest from among one location event that exists within at least one of the location streams, the derivation being based on the request, and iii) generate a derived event stream that comprises the event of interest; and
    generating a notification to call an user agent, based on the generating of the derived event stream.

12. The system of claim 11 wherein the user agent represents a person in the plurality of persons.

* * * * *

UNITED STATES PATENT AND TRADEMARK OFFICE
CERTIFICATE OF CORRECTION

PATENT NO. : 8,155,672 B2  
APPLICATION NO. : 12/211579  
DATED : April 10, 2012  
INVENTOR(S) : Ratan Bajpai et al.

It is certified that error appears in the above-identified patent and that said Letters Patent is hereby corrected as shown below:

In the Claims:

Column 10, Claim 10, line 29, change "tracking the density" to --tracking a density--.

Signed and Sealed this  
Third Day of December, 2013

Margaret A. Focarino  
*Commissioner for Patents of the United States Patent and Trademark Office*